Patented Nov. 13, 1945

2,388,677

UNITED STATES PATENT OFFICE 2,388,677

SOLUBLE OIL AND PROCESS FOR PRODUCING SAME

Charles A. Cohen, Elizabeth, N. J., assignor to Standard Oil Development Company, a corporation of Delaware No Drawing. Application December 26, 1940, Serial No. 371,777

11 Claims. (Cl. 260—504)

This invention relates to an improved soluble oil and the process of its production. More particularly, it is concerned with soluble mineral oils which are compounded with the neutralization products of a group of oil-soluble sulfonic acids derived from the sulfuric acid treatment of petroleum hydrocarbons, known technically as "mahogany soaps."

Soluble oils are oils which readily emulsify when added to water and are used extensively in the textile industry in the processing of cotton, wool, rayon and silk; in the mechanical trades as cutting oils; in the leather industry for fat liquoring and in agriculture and animal husbandry as plant, fruit and animal sprays. In addition to the above, soluble oils are used in a wide variety of cleansing and degreasing operations or constitute a base for the production of emulsified liquid polishes.

In compounding soluble oils, a number of methods have been used, the common ones being the addition to the oil of: (1) a fatty acid soap the basic constituent of which may be an alkali metal or ammonia, or an organic amine such as triethanolamine and morpholine, (2) a partially or fully saponified vegetable oil or animal fat, (3) a saponified rosin and (4) a mahogany soap. These methods may be used singly or in combination depending on the oil to be emulsified and the type of emulsion required. The fourth method using mahogany soap accounts for the major volume of soluble mineral oils in current use.

Mahogany soaps are obtained as a by-product in the production of highly refined mineral oils or white oils. In the production of white oils, a petroleum distillate is treated under drastic conditions with as much as 50% by volume of strong sulfuric acid or fuming sulfuric acid, usually in a number of dumps; the sludge formed in the treatment is separated from the oil usually by settling, and the acid oil neutralized and washed with an immiscible solvent such as dilute alcohol, acetone and the like. A group of oil-soluble sulfonic acids known as "mahogany acids" formed during the acid treatment, which remain in the oil after separation of the sludge, are thereby neutralized and extracted, and when the solvent is removed by distillation, the product remaining is known as "mahogany soap." When properly purified and added to mineral oil in an amount from about 3% to 15%, the mixture is known as a soluble oil and gives an emulsion when added to water. The mahogany soaps secured by this means may vary in color from a straw through mahogany to a deep red.

A second major by-product formed in the sulfuric acid treatment of petroleum distillates consists of a group of water-soluble sulfonic acids which remain in the sludge layer and may be separated by appropriate means. These are known as "green" or "black" acids.

It has now been found that the major part of the color of the mahogany soaps as ordinarily prepared is due to the inclusion of "pepper sludge" in the acid oil at the time the oil is neutralized and extracted with solvent. As indicated above, the oil is treated with strong or fuming sulfuric acid and the sludge separated from the oil by settling and decantation. The acid oil leaving the settler contains some dissolved sulfur dioxide, some mahogany sulfonic acids in solution and in addition, is nearly opaque and black in color due to the presence of a quantity of suspended or dispersed particles or globules of "green" or "black" acids, tar and sludge which shows no disposition to settle even after long standing. These dispersed particles of black acid, tar and sludge are known collectively as "pepper sludge" and appear to be in a colloidal state of suspension. The pepper sludge is highly acidic in nature and when neutralized has great tinctorial power. When acid oil containing pepper sludge is neutralized and extracted with a solvent, the neutralized pepper sludge is included in the mahogany soap giving the soap its characteristic color.

Pure mahogany sulfonic acids are strong acids and give neutral salts or soaps with strong alkalies. They are true sulfonic acids and can be characteristically differentiated from alkyl sulfates or esters of sulfuric acid in that they do not hydrolyze to free sulfuric acid even after long boiling with concentrated hydrochloric acid or water. The organic portion of the mahogany acid is generally considered to be of a naphthenic character, even though predominately paraffinic oils, such as Pennsylvania oils, give rise to essentially the same types of mahogany acids as are derived from other crudes. When pure, the mahogany soaps have a good tolerance for salts of the alkaline earths and can therefore be used as emulsifying agents for oils in regions where hard water is available. On the other hand, alkaline earth salts of the "green" or "black" acids, when added to emulsions, cause a reversal in phase and are often used to break emulsions. The inclusion, therefore, of some pepper sludge with its attendant green acid in the mahogany soap at the time of neutralization, gives not only a poorer colored soap but also causes a decrease in its emulsifying power.

It would seem to be obvious to one versed in the art that it would be possible to prepare a soluble oil simply by separating the sludge from the acid oil, neutralizing the acid oil with a base and removing the water formed during neutralization, but attempts along this line in the past have repeatedly given unsatisfactory products which were poor in color and which failed to emulsify when added to water. The reasons for failure have in the main been twofold; (1) the presence of sulfur dioxide in the acid oil at the time of neutralization yields sulfites and bisulfites, which remain in the oil and exert an emulsion-breaking influence, and (2) the presence of "pepper sludge" in the acid oil at the time of neutralization causes the "green acid" soaps to become intimately admixed with the mahogany soap and not only materially darken the color of the resulting product but also lower the emulsifying power of the product due to the phase reversal influence of the "green acid" salts.

One of the major objects of this invention is to prepare soluble oils by the neutralization of a sulfuric acid treated petroleum hydrocarbon containing mahogany acids, which has been entirely freed of sulfur dioxide and "pepper sludge" prior to neutralization.

According to the present invention, a sulfuric acid-treated oil, after substantial removal of the sludge by settling or by centrifuging but before neutralization, is treated with a finely divided substance selected from the group comprising filter aids of diatomaceous origin, materials of siliceous origin such as tripoli or finely ground silica, or activated carbon; the finely divided substance-pepper sludge complex removed by settling and/or by filtration; the dissolved sulfur dioxide removed by air blowing or by vacuum stripping and the resulting oil containing only mahogany acid, neutralized by a base. This process yields a product which readily emulsifies in water and varies in color from a water-white to a pale yellow.

Materials of diatomaceous origin which are suitable for the practice of this invention are commercially available as filter aids such as the "J-M Celites" and "Filter Cels" or "Dicalites." Either the natural dried and ground earth may be used or it may be calcined with or without alkali or may be acid-treated and calcined. Materials of siliceous origin such as tripoli or finely ground silica such as is used for polishing agents and commercially available as "Snow Floss" or "Super Floss" are suitable as is finely ground carborundum. Another class of materials suitable for the practice of this invention are the finely ground carbons which may be natural, acid treated, or activated types. Other materials of like nature may be used but the above are the preferred types. Various finely ground clays, such as Attapulgus fines, may be used but materials such as Bentonite are not considered desirable.

The diatomaceous filter acid or tripoli or silica and the like is added to the acid oil in an amount equal to from 1 to 40 lbs. per thousand gallons of oil. The method of treating the oil with the above substances may be varied from either the direct addition of these materials to the oil in the form of a dry powder or the materials may be previously admixed with a portion of clear oil to form a slurry which can be pumped into the main body of the oil. The oil, after the addition of the filter aid, may be agitated for a period of from 5 minutes to ½ hour. If, for example, filter aid has been used, the filter aid-pepper sludge complex is then removed either by filtering or by settling.

If filtering alone is used, it may be done with conventional filter presses such as the plate and frame press or with a continuous rotary type of press. It is advantageous when using a filter press to precoat the press with filter aid in the proportion of 5 to 10 pounds of filter aid for every one-hundred square feet of filter press area. If settling is the means used for removing the filter aid-pepper sludge complex from the acid oil, it may be accomplished by running the acid oil-filter aid mixture into a settling drum at a rate designed to give the oil a settling time of from 5 minutes to one hour. A combination of settling and filtration may be used in that the oil after treatment is given a settling sufficient to drop most of the filter aid-pepper sludge complex out and is then finished by filtering either with or without the addition of more filter aid. An alternate method of separating the filter aid sludge complex from the oil is by means of a centrifuge such as a basket type or one capable of discharging a slurry continuously.

The inventor has not attempted to postulate a theoretical mechanism for the operation of this invention but the diversity of materials which are suitable for the practice of this invention and the rapidity with which agglutination or clumping of the pepper sludge particles takes place after the filter aid or tripoli or silica has been added, without diminishing within practical limits the original mahogany acid content of the acid oil, has led the inventor to believe that the phenomenon represents a mutual coprecipitation of oppositely charged colloidal particles. A curious observation in the practice of this invention is that within certain limits, the less filter aid is used, the more rapidly does the filter aid-pepper sludge complex settle. This is thought to be due to the fact that the pepper sludge has a relatively high density and when precipitated with the filter aid, the less the amount of filter aid used the higher the resultant density. If the oil has been treated with enough acid to make a white oil, that is, shows no residual sulfonatable material, the oil leaving the settler or filter press is perfectly clear and water-white and has a color of +30 Saybolt.

The oil leaving the sludge separator, where most of the sludge has been permitted to settle out, will vary in temperature from substantially atmospheric temperature to about 100° C., depending on the conditions and the severity of the acid treat. Some cooling takes place in the sludge separator, but under certain conditions it may be desirable to apply heat artificially to the oil-sludge mixture in order to maintain a state of fluidity or to reduce the viscosity of the oil while settling.

The acid oil after contacting with filter aid, or silica or tripoli and the like, and settling or filtration, is perfectly free of pepper sludge and contains the original amount of mahogany acids present along with a certain amount of dissolved sulfur dioxide.

The sulfur dioxide is then removed by air blowing, or by countercurrent air or inert gas stripping in a packed or bubble plate column, or the acid oil may be subjected to vacuum at ordinary or elevated temperatures by means well known to the art. The removal of the sulfur dioxide may be made an inherent feature of the filtration step in that the filtration may be run under vacuum such as is commonly done in the laboratory in a Buchner funnel or a combination of pressure and vacuum may be used.

The acid oil is then neutralized at this stage with a basic material such as ammonia, the alkali hydroxides, carbonates and the like, or organic bases such as the various ethanolamines, isopropanolamines, pentanolamines and morpholine may be used. The bases may be added either in aqueous or organic solution such as alcohol, and the excess solvent removed by heating under atmospheric or subatmospheric conditions.

The product so obtained may be used as a soluble oil directly or may be used as a base which can be fortified with a further quantity of mahogany soap, other emulsifying agents and coupling agents such as diethylene glycol and the like.

In treating petroleum distillates with strong or fuming sulfuric acid for the purpose of producing white oil, it is customary to conduct the treating procedure by adding the acid to the distillate in a succession of dumps, separating the sludge in between each acid dump. Experience has shown that there is a gradual diminution between acid dumps of the more unstable constituents of the distillate with a consequent increase in the unsulfonatable residue. Fully treated white oils in general show an unsulfonatable residue of 100%. With successive acid dumps there is a gradual increase in the mahogany acid concentrations of the acid oil until a maximum is reached, at which point successive acid dumps begin to destroy some of the mahogany acids with a consequent decrease in their concentration toward the finish of the acid treat. The relative concentrations of the unsulfonatable residue and mahogany acids will naturally vary depending on the percentage of acid used in each dump and also on the nature of the crude oil and finishing operation used in preparing the distillate. It will therefore be seen that there is considerable latitude in determining the point where the present process may be specifically applied to an acid treated petroleum distillate. If, for example, it is desired to obtain a soluble oil having the maximum concentration of mahogany soaps, the process will be applied somewhere in the middle of the acid treatment, basing this point upon the total number of acid dumps required to yield an oil having an unsulfonatable residue of 100%. If, on the other hand, it is desired to have as a base oil in the soluble oil an oil which is substantially a white oil, the process of this invention will then be applied at the finish of the acid treatment. When the present process is applied to the oil at the conclusion of the acid treatment, the amount of mahogany acid present in the oil at the time it is neutralized may be insufficient to cause the oil to emulsify merely on the addition to water and in such cases it is contemplated that the soluble oil so prepared may be fortified by either the addition of more purified mahogany soap or by the addition of other emulsifying agents and coupling agents.

The soluble oils made in accordance with this invention possess valuable advantages over soluble oils of the prior art. In addition to showing a higher degree of emulsifying power as compared to the same oil with attendant neutralized pepper sludge, the new oil is free from staining tendencies when used in the wet processing of white textiles.

The invention will be more clearly illustrated by the following examples:

*Example 1*

1000 gallons of an oil which when finished has a viscosity of 85 seconds Saybolt at 100° F. was treated after settling for 15 hours following the third acid dump with 20 lbs. of J-M 545 Celite, agitated for a period of 15 minutes at a temperature of about 30° C., allowed to settle for one-half hour when most of the pepper sludge-filter aid complex had settled out, and then filtered thru a plate and frame press which had been previously precoated with the same filter aid to the extent of 5 lbs. of filter aid for every 100 sq. ft. of filter press area. The filtered oil was then blown with dry air for about 1 hour when analysis showed the oil to be entirely free of dissolved sulfur dioxide and to have an acidity due to mahogany acid equivalent to about .5 gram of NaOH for each 100 cc. of acid oil. The oil was then exactly neutralized with a 10% aqueous solution of sodium hydroxide using agitation. The soluble oil was then finished by heating at atmospheric pressure at a temperature of about 110° C. until analysis showed that the water content was less than one-tenth of 1% by weight. Analysis of the finished oil showed it to contain about 5 grams of mahogany soap for each 100 cc. of oil and the oil had a color of 2.1 yellow, .2 red when measured in a 1" cell in a Lovibond tintometer. On adding the oil to water an excellent and stable emulsion was obtained.

*Example 2*

A quantity of acid oil was worked up in exactly the same manner as in Example 1 except that the sulfur dioxide was removed by allowing the oil after removal of the pepper sludge filter aid complex to trickle through a packed column while maintaining a vacuum on the column. The reservoir into which the acid oil coming from the tower was allowed to flow and which was connected to the same vacuum system showed an absolute pressure of 15 mms. of mercury. On testing this oil for sulfur dioxide, it was shown to be substantially free of this material. The oil was then neutralized and the water removed in the same manner as in Example 1 and gave a satisfactory emulsion when mixed with water.

I claim:

1. A method for producing a soluble oil which comprises contacting a sulfuric acid-treated oil while in an acid condition with a finely divided substance selected from the group consisting of diatomaceous filter aids, tripoli, and activated carbon to form a finely divided substance-pepper sludge complex, removing the finely divided substance-pepper sludge complex and sulfur dioxide and neutralizing.

2. The method of producing a soluble oil which comprises contacting a sulfuric acid-treated oil while in an acid condition with a finely divided substance selected from the group consisting of diatomaceous filter aids, tripoli, and activated carbon to form a finely divided substance-pepper sludge complex, removing the finely divided substance-pepper sludge complex, air blowing the resultant oil to remove sulfur dioxide and neutralizing.

3. The method of producing a soluble oil which comprises contacting a sulfuric acid-treated oil while in an acid condition with a finely divided substance selected from the group consisting of diatomaceous filter aids, tripoli, and activated carbon to form a finely divided substance-pepper sludge complex, removing the finely divided substance-pepper sludge complex, placing the oil under reduced pressure to remove the sulfur dioxide and neutralizing.

4. The method of producing a soluble oil which comprises contacting a sulfuric acid-treated oil while in an acid condition with a finely divided diatomaceous filter aid to form a finely divided filter aid-pepper sludge complex, removing the finely divided filter aid-pepper sludge complex and sulfur dioxide and neutralizing.

5. The method of producing a soluble oil which comprises contacting a sulfuric acid-treated oil while in an acid condition with a finely divided tripoli to form the finely divided tripoli-pepper sludge complex, removing the finely divided tripoli-pepper sludge complex and sulfur dioxide and neutralizing.

6. The method of producing a soluble oil which comprises contacting a sulfuric acid-treated oil while in an acid condition with a finely divided substance selected from the group consisting of diatomaceous filter aids, tripoli, and activated carbon to form a finely divided substance-pepper sludge complex, filtering out the finely divided substance-pepper sludge complex, removing the sulfur dioxide and neutralizing.

7. The method of producing a soluble oil which comprises contacting a sulfuric acid-treated oil while in an acid condition with a finely divided substance selected from the group consisting of diatomaceous filter aids, tripoli, and activated carbon to form a finely divided substance-pepper sludge complex, permitting the finely divided substance-pepper sludge complex to settle and withdrawing the treated oil by decantation, removing the sulfur dioxide and neutralizing.

8. The method of producing a soluble oil which comprises contacting a sulfuric acid-treated oil while in an acid condition with a finely divided substance selected from the group consisting of diatomaceous filter aids, tripoli, and activated carbon to form a finely divided substance-pepper sludge complex, removing the finely divided substance-pepper sludge complex and sulfur dioxide and neutralizing the acid oil with sodium hydroxide.

9. The method of producing a soluble oil which comprises contacting a sulfuric acid-treated oil while in an acid condition with a finely divided substance selected from the group consisting of diatomaceous filter aids, tripoli, and activated carbon to form a finely divided substance-pepper sludge complex, removing the finely divided substance-pepper sludge complex and sulfur dioxide and neutralizing the treated oil with sodium carbonate.

10. The method of producing a soluble oil which comprises treating a hydrocarbon distillate with sulfuric acid, removing the sludge which readily settles out, contacting the remaining acid-treated oil with a finely divided substance selected from the group consisting of diatomaceous filter aids, tripoli and activated carbon to form a finely divided substance-pepper sludge complex, filtering to remove the finely divided substance-pepper sludge complex, air blowing until all sulfur dioxide is removed and neutralizing with sodium carbonate.

11. The method of producing a soluble oil which comprises treating a hydrocarbon distillate with sulfuric acid, removing the sludge by centrifuging until the oil contains not more than 1% of sludge by volume, contacting the remaining acid-treated oil with diatomaceous filter aid to form a finely divided filter aid-pepper sludge complex, filtering to remove the finely divided filter aid-pepper sludge complex, air blowing the oil until it is free of sulfur dioxide and neutralizing the oil with sodium carbonate.

CHARLES A. COHEN.